Jan. 29, 1957

P. I. HOLLMAN 2,779,400

AUTOMATIC LIGHTING AND CONTROL MEANS

Filed Jan. 23, 1946

Inventor:
Peter J. Hollman
By McCanne & Morsbach
Attys.

Jan. 29, 1957  P. I. HOLLMAN  2,779,400
AUTOMATIC LIGHTING AND CONTROL MEANS
Filed Jan. 23, 1946  6 Sheets-Sheet 2

TO SUB-BURNER

Inventor:
Peter I. Hollman
By McCanna & Morsbach
Attys.

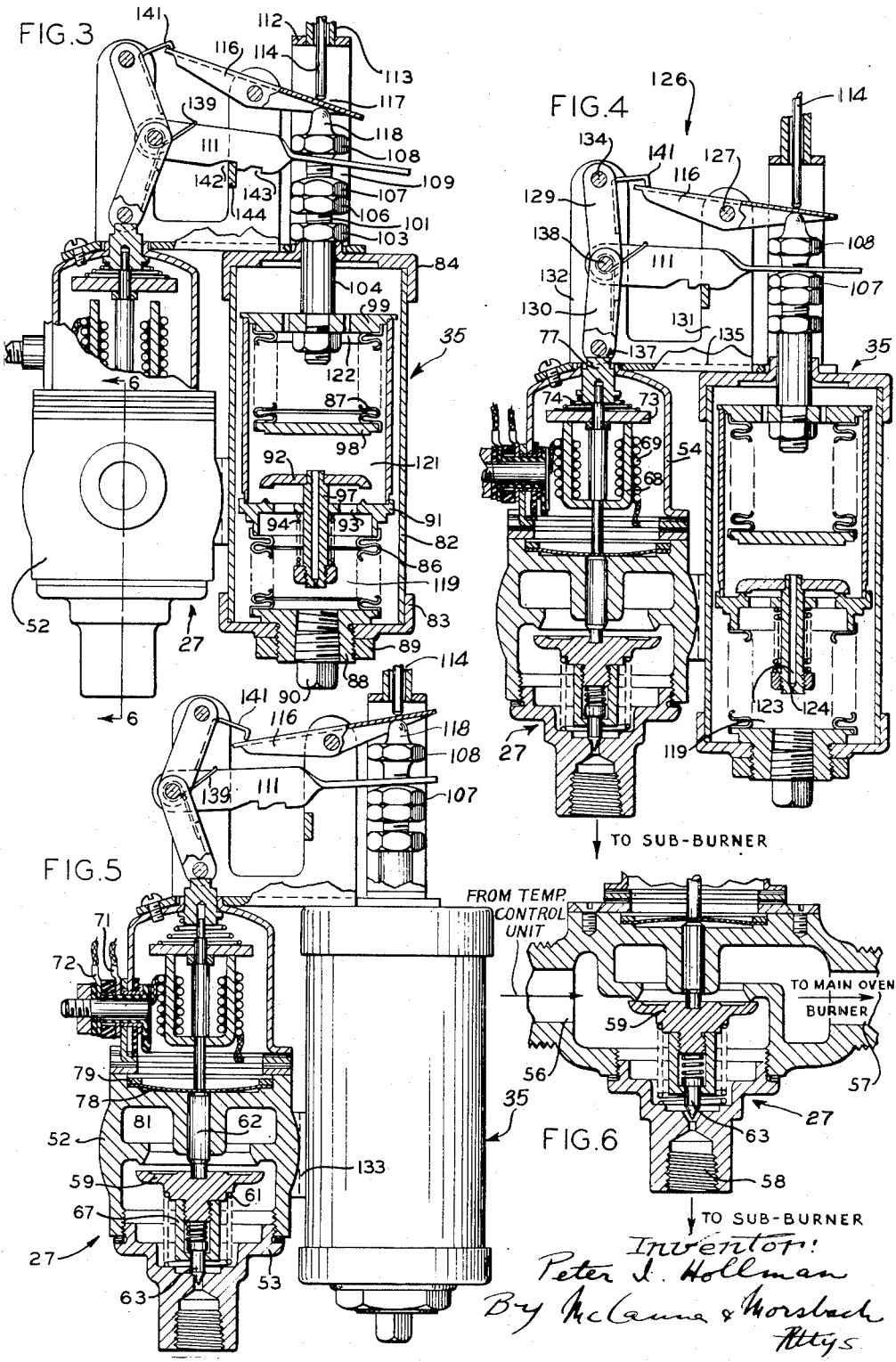

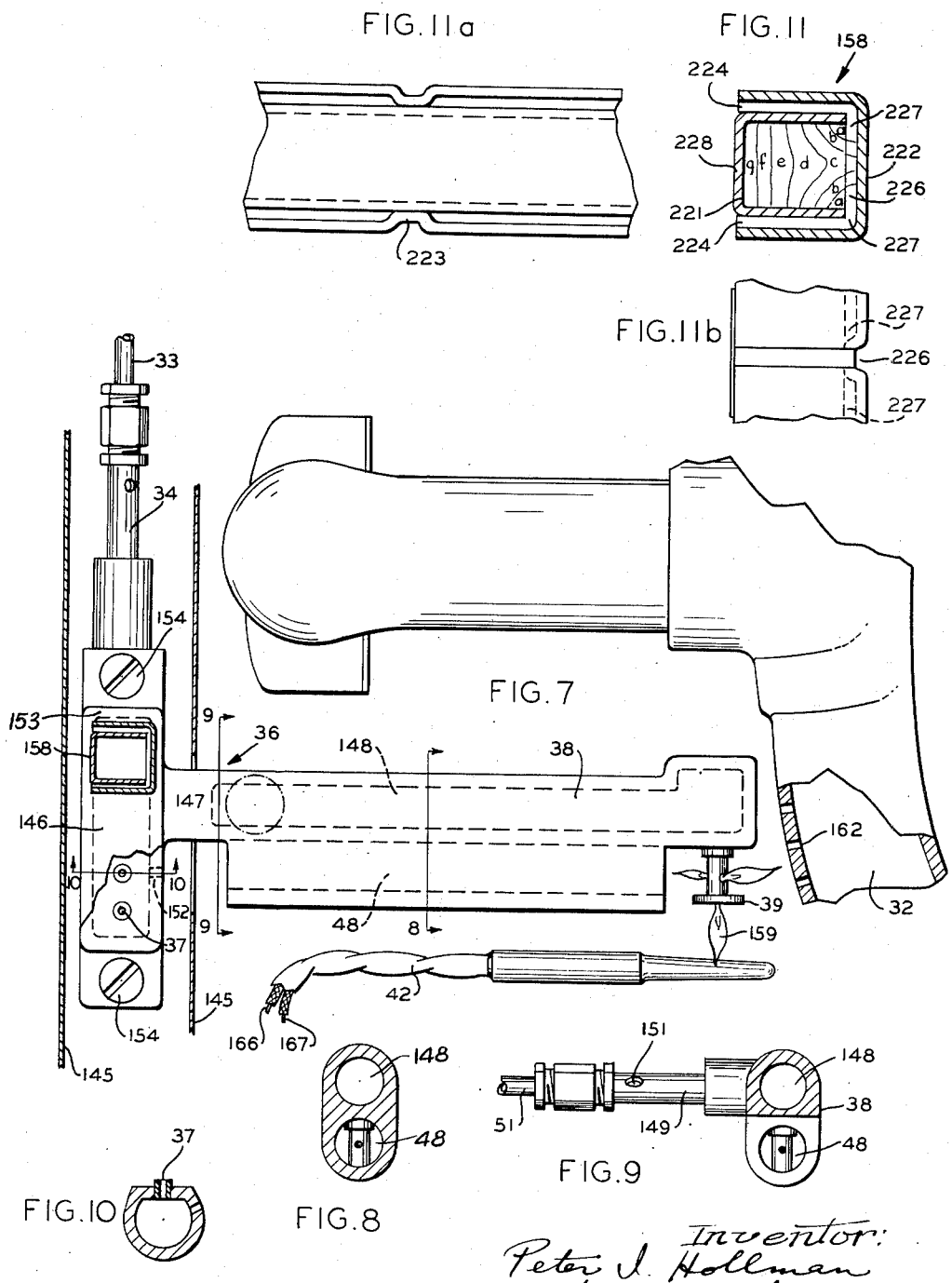

Jan. 29, 1957 P. I. HOLLMAN 2,779,400
AUTOMATIC LIGHTING AND CONTROL MEANS
Filed Jan. 23, 1946 6 Sheets-Sheet 5
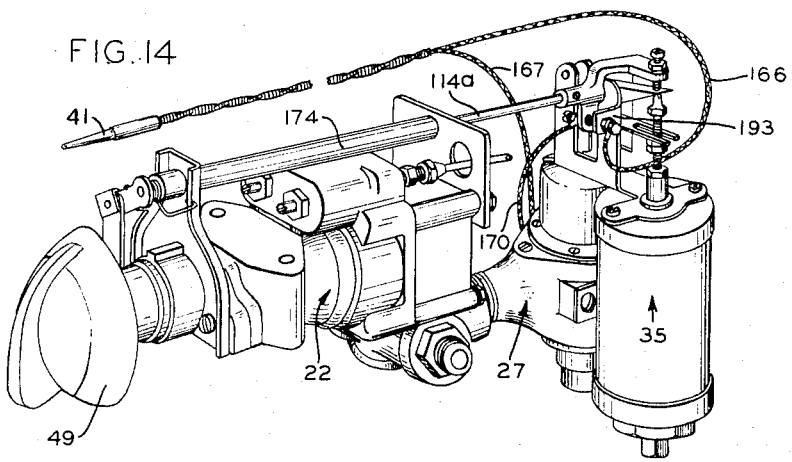
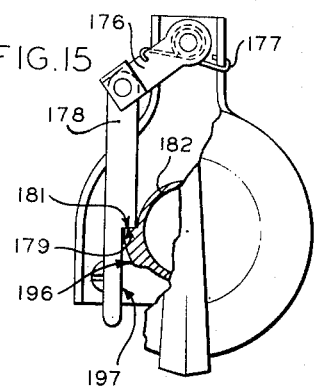
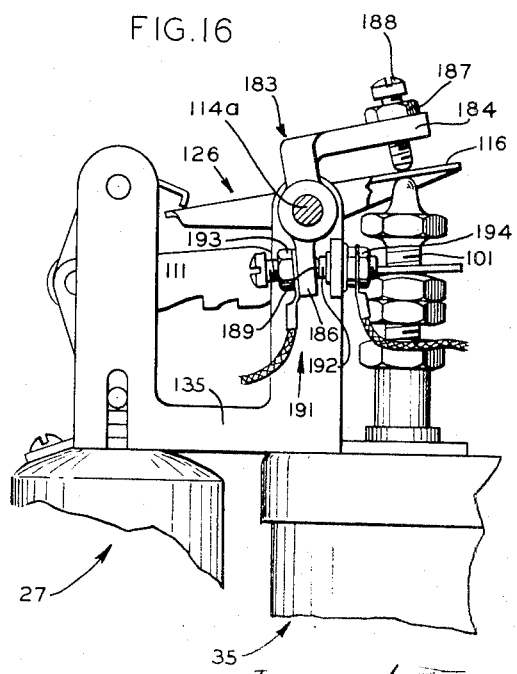

_United States Patent Office_

2,779,400
Patented Jan. 29, 1957

2,779,400

AUTOMATIC LIGHTING AND CONTROL MEANS

Peter I. Hollman, Rockford, Ill., assignor to Geo. D. Roper Corporation, Rockford, Ill., a corporation of Illinois Application January 23, 1946, Serial No. 642,941

20 Claims. (Cl. 158—133)

This invention relates generally to gas lighting devices and particularly to the automatic lighting of gas burning kitchen stoves or ranges.

A problem heretofore unsolved satisfactorily is presented in the lighting of the oven burner of the so-called table top kitchen stove where the oven burner is located at a substantial distance below the top cooking burners.

In the early constructions of table top stoves, the oven burner was lighted by hand, with a match or flint resulting in dangerous puffing or even a serious explosion if the gas was turned on before the match was lighted. Other disadvantages are attendant with this type of lighting in that the housewife or other operator must stoop down to an awkward position to reach the burner within the oven.

In later constructions this objectionable hand lighting has been eliminated by providing a second constantly burning pilot burner in the oven, in addition to the one that is provided at the top of the stove for lighting the cooking burners. The oven burner is lighted simply by turning the temperature control knob, in the same manner as the cooking burners are lighted. While in some respects this construction does operate satisfactorily, it is objectionable from the standpoint of the extra cost required to suply this second pilot burner with gas.

In still later constructions, a semi-automatic oven lighting system has been devised employing an intermittently lighted sub-burner or oven pilot burner which is lighted by flashback through a flashtube extending to the constantly burning cooking pilot when the oven temperature control knob is turned. Inasmuch as a certain time interval is required before the flashback tube can be filled with a flashable gas-air mixture to light the sub-burner, and, for safety, the gas must not be allowed to issue from the main burner ports until the sub-burner is lighted, the operation proceeds in two phases. The housewife first turns the control knob a small amount to a point where it encounters slight resistance to turning. At this position she pauses for a few seconds while the sub-burner is being lighted. Then, second, when she hears the flash in the flashtube, or after she waits a length of time which by experience she has found sufficient to light the sub-burner, she turns the knob further to the desired temperature setting thereby admitting gas to the main burner which is lighted from the sub-burner. While this construction also operates satisfactorily in many resepcts and eliminates the need for a costly constantly burning second pilot burner, it would be preferable that it be fully automatic so the housewife could light the oven simply by turning the control knob, in a single operation, to the temperature desired, instead of remembering each time to pause in the intermediate position long enough for the sub-burner to be lighted.

Accordingly, an object of my invention is the provision of an oven lighting system for a table top stove which is completely automatic in operation in that the housewife simply turns the oven control knob to the desired temperature setting in one continuous, easy sweep; yet it employs no costly second constantly burning pilot burner and uses no outside energy such as electricity, the housewife needs no special training or experience to operate it, and it is absolutely safe and dependable. In some respects my invention represents an improvement over the system described in the preceding paragraph in which I employ a timing mechanism to automatically open the sub-burner and main burner valves in proper timed sequence to, first, light the sub-burner and, second, to light the main burner, the timing mechanism being set into operation by simply turning the oven control knob to a desired temperature setting.

Other objects and advantages will be apparent to those skilled in the art as the invention becomes better understood by reference to the following description when considered in connection with the accompanying drawings, in which—

Figure 3 is a view similar to Figure 2 showing the parts as they will be positioned immediately after the control knob has been depressed to initiate the oven lighting operation;

Figures 4 and 5 are views similar to Figure 2 showing later stages of the lighting operation;

Figure 6 is a section on the line 6—6 of Figure 3;

Figure 7 is an enlarged view of the sub-burner, flashtube and oven pilot arrangement shown in Figure 1;

Figure 8 is a section on the line 8—8 of Figure 7;

Figure 9 is a section on the line 9—9 of Figure 7;

Figure 10 is a section on the line 10—10 of Figure 7;

Figure 11 is an enlarged cross-section of a portion of the flashtube shown in Figures 1 and 7;

Figures 11a and 11b are side views of the flashtube shown in Figure 11;

Figure 14 is another modification of my invention showing how the parts would be arranged to provide for rotative motion only of the control knob instead of a combination of reciprocative and rotative motion as shown in Figure 1;

Figure 15 is an enlarged partially cut away front end view of the modification shown in Figure 14;

Figure 16 is an enlarged side view of the front portion of the modification shown in Figure 14, the modification being shown rotated 90° clockwise for convenience in presentation; and Figure 17 is a diagrammatic view of the thermocouple circuit as it would be used with a normally closed thermocouple switch such as shown in Figures 12 and 13.

Like reference characters refer to like parts throughout the drawings.

Figure 1:
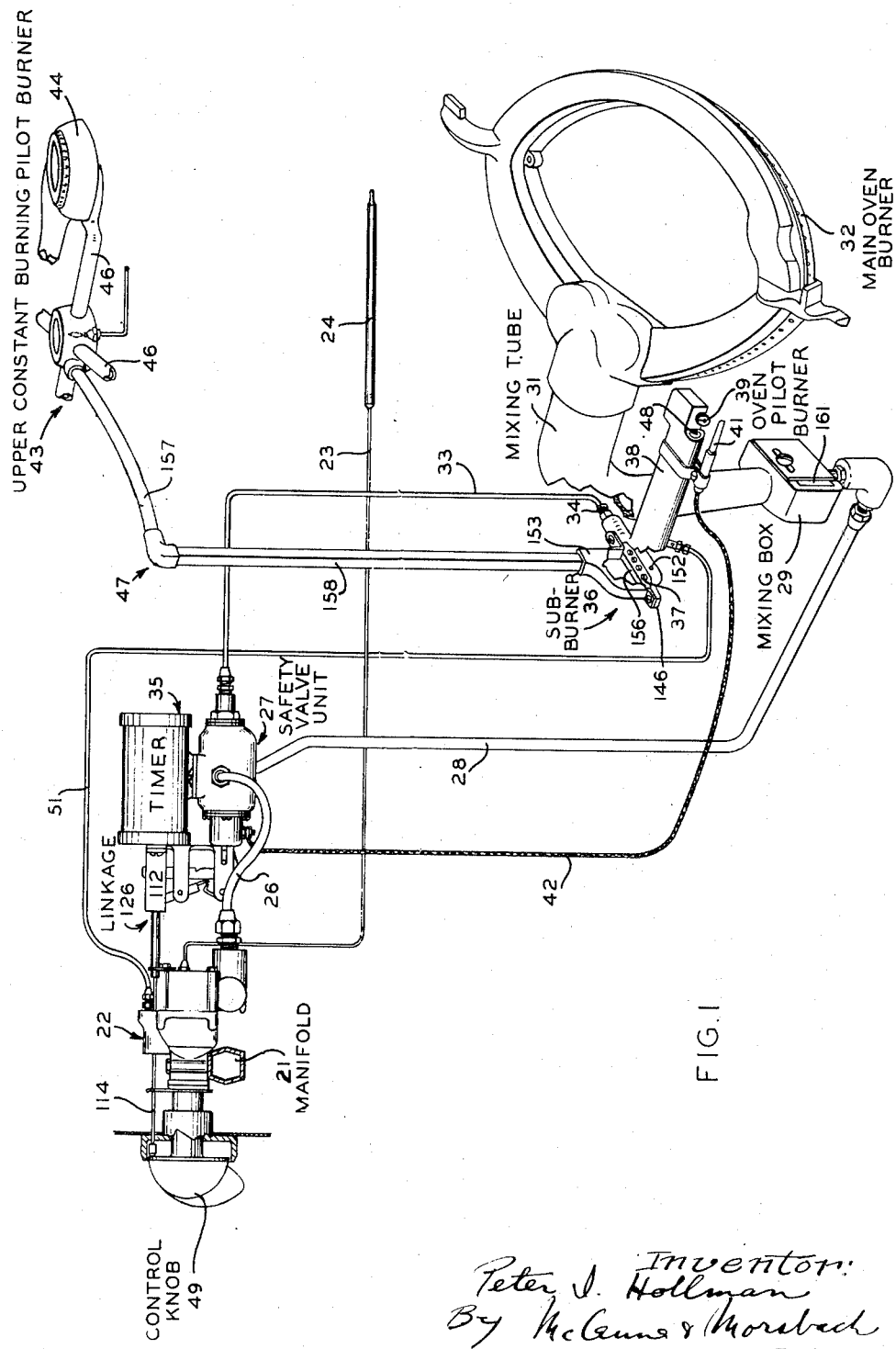
Figure 1 is a schematic view in perspective of an oven lighting system illustrating one embodiment of my invention.

The complete assembly shown in Figure 1 will be first briefly described to provide a general background for a subsequent detailed description of the component parts of the system. Raw gas is supplied from a manifold 21 to an oven temperature control unit generally designated 22, which has a capillary tube 23 terminating in a bulb 24 which will be located in the oven and which is responsive to the temperature to be controlled. The unit 22 delivers gas through a pipe 26 to a safety valve unit generally designated 27, from which gas is supplied through a main line 28 to a mixing box 29, a mixing tube 31, and a main burner 32. Gas is also supplied from the safety valve unit 27 through an auxiliary gas line 33 to a mixing tube 34 which delivers an air-gas mixture to a sub-burner generally designated 36, and having a plurality of jets 37 for burning a number of individual flames. Operation of the safety valve unit is coordinated with the other parts by a timer 35 acting through a linkage generally designated 126. The sub-burner is preferably located outside the oven or in close proximity to the oven and has a lateral burner arm 38 extending into the oven, or into a compartment within the general boundaries of the oven, and a pilot light or burner 39 located in close proximity to the main oven burner 32. The pilot burner 39 is adapted to be lighted from the flames of the sub-burner jets 37, as will be presently described. Heat from the pilot burner 39 acts against a thermocouple 41 which is connected by a two-wire couple lead 42 which connects with the safety cut-out valve unit 27 which functions to supply gas through the gas line 28 to the oven burner 32; that is, the supply of gas to the oven burner will be kept shut off by the safety valve when the thermocouple 41 is cold.

The usual constantly burning pilot burner 43 located at the top of the stove serves to light any one of the top or cooking burners 44 in the conventional manner through its respective flashtube 46. This pilot burner 43 also serves to light the sub-burner jets 37 by flashback through the flashtube 47; and the sub-burner in turn serves to light the oven pilot burner 39 by a flashback through the passage 48 in the arm 38.

Referring now in detail to the component parts of this automatic oven lighting system, the oven heat control 22 and the control knob 49 may be of any suitable or preferred construction, for example, of the type disclosed in Patent 2,303,011, granted November 24, 1942, to which reference may be had for a more detailed description. Briefly, the operation is such that the housewife first depresses the control knob against the action of a spring 163 (see Fig. 12) in the order of ⅛ of an inch and then rotates it to select the proper temperature setting, this rotation causing the unit to admit gas simultaneously to the safety valve inlet line 26 and the oven pilot burner inlet line 51. The oven pilot burner inlet line 51 is connected to the oven heat control unit 22 ahead of the thermostatic valve portion thereof which responds to the temperature in the oven to control the flow of gas to main oven burner 32. Conduit 51 is connected to heat control unit 22 at the outlet side of the operator controlled valve therein, so as to be blocked thereby from communication with manifold 21 except when the operator adjusts the control knob in the described manner.

Figure 2:
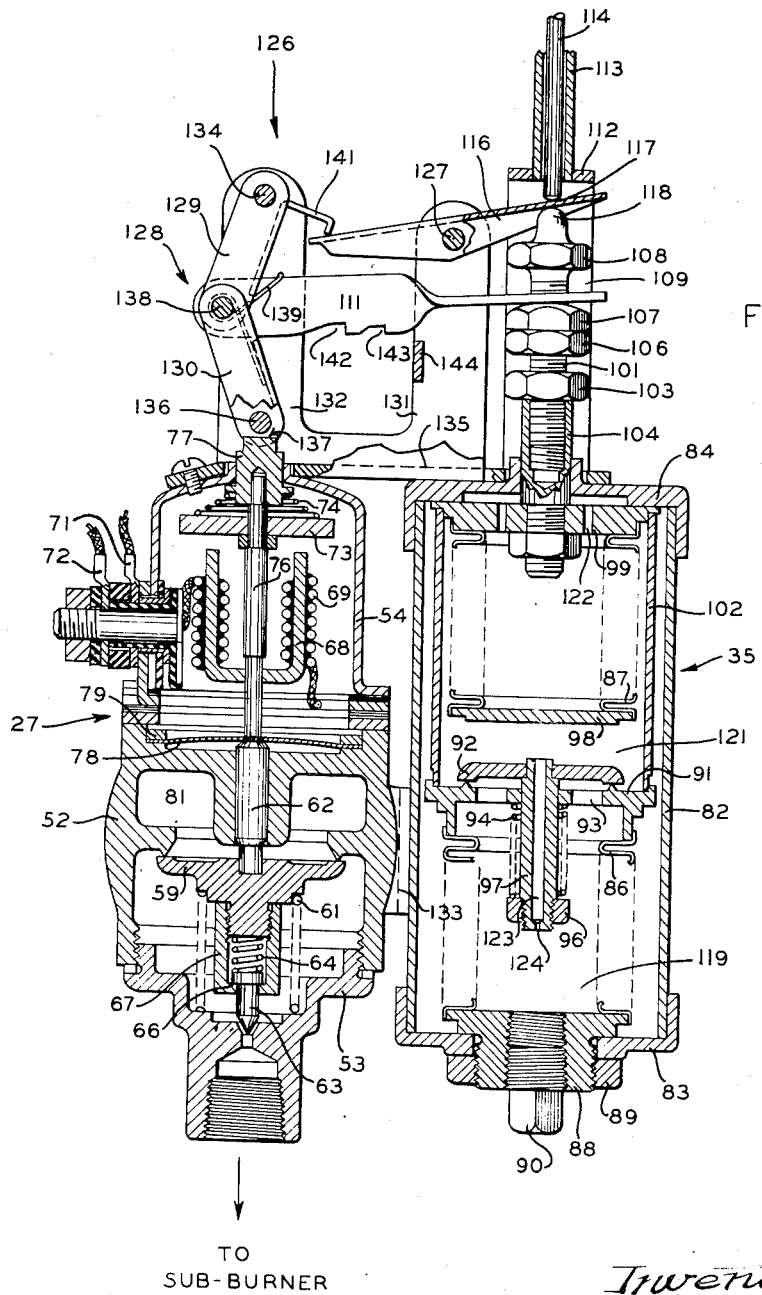
Figure 2 is a sectional view of the timing and safety valve mechanism employed in the embodiment shown in Figure 1, showing the parts in their normal positions before starting the lighting operation (the mechanism in Figure 2 is shown rotated 90° clockwise from its normal position shown in Figure 1, for convenience in presenting as large a view as possible on the page)

Referring now to Figures 2 and 6, the safety valve unit comprises a body 52 fitted at one end with a closure 53 and at the other end with a cup-shaped cover 54. It has the inlet port 56, connected to the temperature controller 22, outlet port 57 leading to the main oven burner 32, and the auxiliary outlet port 58 leading to the sub-burner 36. Flow of gas to the oven burner 32 is started and stopped by the main or safety valve disk 59 which is loaded by the helical spring 61 and guided by the reciprocable valve stem 62. Flow of gas to the sub-burner 36 is started and stopped by the auxiliary valve 63 which is loaded by the helical spring 64, this auxiliary valve being reciprocably engaged within the end portion 66 of the cup-shaped retaining member 67 which is threadedly engaged with the safety valve disk 59. Thus, it will be seen that when the safety valve is closed the auxiliary valve is open, and vice versa. At the opposite end of the safety valve body, within the cup-shaped cover or bell housing 54 is a U-shaped electromagnet 68 having coils 69 which are energized by the current from the thermocouple 41 when a flame from the oven pilot burner 39 impinges upon it, this current being conducted through the bell housing by means of the insulated connector 72 and the ground connector 71. An armature 73, loaded by the spiral spring 74, is reciprocable with the armature stem 76, and, when pressed into contact with the electromagnet by an outside force applied to the reciprocable spud 77, against the thrust of the spring 61, is adapted to be held in the position shown in Figure 5 when the electromagnet is energized by thermocouple current. The armature stem 76 is reciprocable within the spud 77 and independently thereof so that the armature 73 may be held against the electromagnet and at the same time allow the spud 77 to be withdrawn from it by the linkage 126, as shown in Figure 5, for reasons which will be considered in greater detail below. A thin flexible diaphragm 78, held in place by a retaining ring 79, serves to prevent the escape of gas from the valve chamber 81 into the bell 54 and at the same time serves to transmit thrust between the valve stem 62 and the armature stem 76 to permit the movement necessary to seat and unseat the valves 59 and 63.

The timing mechanism, generally designated 35, comprises a cylindrical housing 82 having end caps 83 and 84 in which is positioned a first bellows 86 and a second bellows 87. The bellows 86 is attached at one end to a bushing 88 which is engaged with the end cap 83 by means of the lock nut 89. The plug 90 provides access to the interior for filling with liquid. At the other end the bellows 86 is attached to a separating plate 91 having reciprocably engaged therein a check valve 92 and a plurality of check valve passages 93, the check valve being loaded by the helical spring 94 which bears at one end against the separating plate and at the other end against the nut 96 threaded upon the end of the hollow check valve guide stem 97. The bellows 87 has one end closed by means of the disk or plate 98 and the other end is attached to the disk 99 which is engaged by the reciprocable threaded bolt or actuating member 101. The disk 99 and the separating plate 91 are maintained a fixed distance apart by means of the spacer tube 102. The actuating member 101 is limitedly movable with respect to the cylindrical housing 82, its movement in the outward direction being limited by abutment of the disk 99 with the inside of the cap 84 and its movement in an inward direction being limited by abutment of the lock nut 103 with the outside of the cap 84, a spacing bushing 104 of preselected length being interposed between the lock nut 103 and the disk 99. Lock nuts 106, 107, and 108 are arranged to provide a lost motion space 109 for the detent link 111 the function of which will be described in detail below. A bracket 112 is fixed upon the housing to support the sleeve 113 journally engaging the push rod 114 which, in operation, will be depressed by the control knob 49 to condition the timing mechanism comprising the timer 35 and the valve 27 to carry out the oven lighting cycle. A lever 116, whose function will likewise later be explained, in detail is engaged between the rounded ends 117 and 118 of the push rod and actuating member. The compressible chamber 119 within the first bellows 86 and the expansible chamber 121 between the second bellows 87 and the spacer tube 102 will be filled with a fluid, preferably a liquid having a very low variation of viscosity with temperature variations such as certain of the silicon-oxygen liquid compounds known as silicones.

In operation, depressing the control knob 49 will depress in turn the push rod 114, the actuating member 101, and the spacer tube 102 compressing the compressible chamber 119, forcing fluid past the check valve 92 into the expansible chamber 121 and compressing the bellows 87. As the compression of the bellows 87 proceeds, air escapes from the bellows 87 through the apertures 122 formed in the disk 99. The maximum compression of the bellows 87 occurs when the parts are in the positions shown in Figure 3. In this position a pressure equilibrium is reached and the check valve reassumes its seated position under the urgence of spring 94. After being depressed, the knob 49 is turned to the desired temperature setting and then released, spring 163 (see Fig. 12) restoring the knob to its outward position. Under the above conditions the resiliency of the bellows urges them to return to their original position. The fluid in chamber 121 is thus slowly returned to the chamber 119 through the return passage 123, the rate of flow being determined by the size of the orifice 124. As the fluid returns, the actuating member 101 is moved slowly outward at a rate of speed predetermined by the size of the orifice 124 to actuate the cycling linkage generally designated 126 which moves the valve disk 59 and valve 63 in the safety valve through a predetermined timed sequence of operating positions.

The operating linkage or cycling mechanism 126 includes the lever 116, the toggle 128 having toggle bars or links 129 and 130, and the detent link 111. The linkage is mounted on a bracket 135 having spaced upper arms 131 and spaced lower arms 132. The bracket 135 together with the bracket 133 serve to tie the timer 35 and the safety valve 27 together as well as to mount the linkage 126. The lever 116 is pivotally mounted on a pin 127, supported by the upper arms 131. The toggle 128 has an end pivot pin 134 fixed in lower arms 132, and a movable end pivot pin 136 adapted to be engaged with the end surface 137 of the spud 77, and a knee pivot pin 138 engaged with the end of the detent link 111. A formed wire spring 139 engages the detent link and the toggle bar 130 in such a manner as to urge the detent link in a clockwise direction about the knee pivot pin 138 and to urge the parts downwardly (i. e., to the left in Figure 2). A hook 141 is attached to the toggle bar 129 in such a manner as to engage the end portion of the lever 116 and the detent link 111 is formed with first and second detent notches 142 and 143, respectively, which are adapted to engage the stationary bar 144 at different operative positions of the link 111 in a manner to be described hereinafter.

As best shown in Fig. 7 the sub burner 36 comprises a formed metallic housing 147, which will usually be made of cast iron or the like, having the sub-burner portion proper designated 146, shown as it will be normally positioned between the stove walls 145, and the pilot burner arm 38 extending laterally to the oven burner 32. The arm 38 is formed with the passageway 148 furnishing communication between the oven pilot burner supply tube 51 and the oven pilot burner 39. A mixing tube 149 having the air opening 151 is interposed between the supply tube 51 and the arm 38 for the admission of primary air. A flashback passage 48 is formed in the arm 38 and is aligned with the flashback feed aperture 152 formed in the side of the sub-burner portion 146 so that when gas is supplied to the sub-burner 36 a quantity of gas will enter the flashback passage 48 from the aperture 152, as well as from the pilot burner 39 itself, and when the sub-burner jets 37 are lighted the pilot burner 39 will in turn be lighted by flash through the passage 48.

A mixing tube 153 (Figures 1 and 7) having a shape, which may be roughly described as that of an inverted funnel, is fastened above the sub-burner jets 37 by means of screws 154, and is spaced above the sub-burner a distance indicated by the numeral 156 for the admission of secondary air to the jets 37. It discharges into the flashtube generally designated 47 which communicates with the upper or constantly burning pilot burner 43. The flashtube 47 comprises an upper imperforate substantially horizontal portion 157 and a lower substantially vertical perforate portion 158 having a novel cross-section, the function of which will be explained in the paragraphs immediately following.

Figs. 11, 11a and 11b show one form of flashtube portion designated 158 which has been found to operate without adjustment on a wide range of fuel gases. Basically, it comprises two channel-formed members, an inner member 221 and an outer member 222. The inner member is telescopically fitted into the outer member as shown and is maintained in that position by means of crimps 223 formed in the side walls of the outer member, these crimps serving to grip the inner member and to space the corresponding side walls of the channel members apart to provide the inlet air passages 224. The base portion of the outer channel member is crimped as shown at 226 to provide the air inlet slits 227 at adjacent corners of the flashtube, the crimps being narrow so that the air inlet passages 224 and the air inlet openings 227 may be substantially continuous along the length of the flashtube. While two air passages 224 and two air inlet slits 227 are shown, one of each will function in a satisfactory manner under many conditions of operation. The dimensions of the air passages 224 and the slits 227 are determined experimentally for any particular stove installation; for example, on one case I have found that, with a square tube ⅜ inches across the inside, the width of the air passages and slits should be $\frac{1}{32}''-\frac{1}{16}''$.

By experimenting I have found that the satisfactory flashback operation may be had with a flashback tube having only the lower substantially vertical portion 158 formed as shown in Figure 11 and that the upper or horizontal portion 157 may take the form of an ordinary imperforate tube.

Gas flowing upward through the sub burner jets 37 into the mixing tube 153 will entrain a certain amount of primary air through the space 156 in addition to the primary air entrained in the mixing tube 34. This fairly rich mixture will fill the flashtube 47 and, after flow becomes established, secondary air will be drawn in along the entire length of the square section 158 through the elongated openings 227. Flow upward through the tube should be maintained slow enough to be non-turbulent so that throughout the entire length of the vertical portion 158 there is an even gradation across its section of increasing richness from the air openings 227 to the opposite wall 228. According to one theory which has been advanced to explain the successful operation of the flash tube construction with gases of widely different combustion characteristics, there is thought to be a gradation of air and gas across the tube which, in effect, provides a series of coexisting columns of gas within the square tube 158 which increase in richness from the composition of the column "a" (Figure 11) which is practically all air to the composition of the column "g" which is practically the same as the very rich mixture entering the bottom of the tube. As described above, I have found that for the horizontal portion 157 it is not necessary to provide a construction such as shown for the portion 158 because, by the behavior of fluids flowing in viscous flow which is maintained in the flashtube, the laminar character of the flow which is created in the portion 158 will be maintained for a considerable distance in the imperforate section 157 so that a number of layers, which are extensions of columns "a" through "g," of varying enrichment, will be moved to the constantly burning pilot light flame 43. One or several of these layers will be ignited by the constantly burning pilot light and the flame will flash through that layer and its corresponding column in the vertical portion all the way down to the sub-burner. The flame will oscillate back and forth in the tube several times as the pressure forces caused by successive flashes rearranges the layers and remixes them to form new combustible layers and columns. These oscillations occur very rapidly and actually appear to be but a single flash. However, they provide a much more satisfactory and dependable means of lighting the sub-burner than a single flash would in that they provide a number of chances for the sub-burner to light. It is, of course, impossible to state with absolute certainty that the theory of operation as above described is correct, but my observation of the results secured with variously formed tubes leads me to believe that the theory stated is correct. At any rate, the construction illustrated and described has been proved to be thoroughly practical under severe test conditions and does give the results described.

To better understand the above described oven lighter system a description of its operation follows: As shown in Fig. 2, the components of the system are shown in their normal "off" position, that is, the constantly burning pilot burner 43 is burning but gas is prevented from flowing to the oven burner 32, the oven pilot burner 39 and the sub-burner 36. To initiate operation of the lighting system the control knob 49 is depressed against the action of the spring 163 and the index on the knob is rotated to a preselected temperature setting on the heat control unit 22. The act of depressing the knob 49 moves the latter axially and in turn the rod 114, which abuts against the knob 49. The rod 114 abuts against the end of the lever 116 and when the rod is moved axially the lever 116 is caused to be moved in a clockwise direction about the pivot pin 127. The end of the lever 116 also engages the actuating member 101 so that movement of the lever 116 causes the actuating member 101 to be moved axially to initiate operation of the timer 35. The rotational motion of the knob 49 adjusts the heat control unit 22 so that gas flows from the manifold 21, through the heat control unit to both the safety valve supply line 26 and the oven pilot burner line 51. At the end of the inward movement of the knob 49 the component parts of the safety valve 27 and the timer 35 are in the position shown in Fig. 3, the valve 59 being in a closed position and the auxiliary valve 63 being in an open position. During the movement of the parts from their position, as shown in Fig. 2, to their position as shown in Fig. 2, to their position as shown in Fig. 3 it is to be understood that the lever 116 engages the hook 141 attached to the toggle bar 129 so that rotation of the lever 116 causes the toggle bar 129 to rotate in a counterclockwise direction about the fixed pivot pin 134. This causes the toggle mechanism 128 and the detent link 111 to be moved from a position in which the pivot pin 138 is on one side of the centerline of the toggle mechanism as determined by pivot pins 134 and 136 to a position in which the pivot pin 138 is on the opposite side of the centerline and the detent bar 144 is received in the first notch 142. Coincidentally with these movements, as the actuating member 101 is moved into the housing of the timer 35, the bellows 86 is compressed, reducing the volume of the chamber 119. As a result pressure is built up in the chamber 119 which opens the check valve 92 so that the fluid or liquid disposed in the chamber 119 is forced into the chamber 121, the latter being expanded upon the entrance of fluid from the chamber 119. When the actuating member 101 reaches the end of its inward travel a pressure equilibrium is reached between the chambers 119 and 121 and the check valve 92 closes itself under the urgence of the spring 94. As a result of the reformation of the above chambers, forces are set up in the resilient bellows defining the chambers that urge the bellows to return to their original configurations and in turn move the actuating member 101 axially outwardly from the housing of the timer 35.

With the parts in the position corresponding to Fig. 3 gas flows from the manifold 21 through the temperature controller 22 through conduit 51, to the oven pilot burner 39, and flows from the manifold 21 through the temperature control unit 22 through the safety valve supply line 26 through the open auxiliary valve 63 to the sub-burner 36. In flowing to the sub burner 36 a portion of the gas is directed through the aperture 152 into the flashback passageway 48. Simultaneously some gas from the pilot burner 39 also flows into the passageway 48. Gas from the sub-burner 36 is also directed to flow into the upwardly extending flash tube 47 in communication with the constantly burning pilot burner 43. When the flow through the flash tube 47 is of the proper mixture, flame from the constantly burning pilot burner 43 is flashed back to the sub-burner 36 so that gas issuing from the jets 37 is ignited. Thereafter the oven pilot burner 39 is lighted by flashback from the sub-burner 36 through the passage 48. The oven pilot burner 39 is positioned so that its flame 159 impinges directly on the thermocouple 41 to generate a current for energizing the electromagnet 68.

From its position shown in Fig. 3 the actuating member 101 moves outwardly due to the return of the bellows 86 and 87 to their original configuration relative to the detent link 111 through the lost motion connection, defined by the nuts 107 and 108, so that the nut 107 engages the free end of the detent link 111. The spring 139 is fixed on the link 130 and the link 111 so that it tends to urge these links toward each other; that is, the link 111 is stressed to move in a clockwise direction about the pivot 138 and the link 130 is stressed to move in a counterclockwise direction about the pivot 138. As the actuating member 101 moves upward or outward it causes the detent 111 to be moved counterclockwise about the knee pivot pin 138 against the action of the spring 139 to increase the angle between the links 111 and 130 so that the notch 142 in the link 111 clears the shoulder 144. As soon as the notch 142 clears the shoulder 144 the links 130 and 111 are in effect collapsed. The collapsing movement of these links is caused by a force urging the link 111 to the left and a force urging it downwardly because the force of the spring 139 on the link 130 acts on the pin 134 to move the link 129 clockwise and the link 130 downwardly, the latter's free end supporting the pin 136 being free to move. The composite downward and leftward movements of the link 111 is correlated with the movements of the links 129 and 130 and the upward movement of the stem 101 so that the notch 143 engages the shoulder 144 when the parts are in the position shown in Fig. 4. At this position of the parts the knee pivot pin 138 and the end pivot pins 134 and 136 are in substantial alinement for maximum inward displacement of the spud 77. This inward displacement of the spud presses the armature 73 into contact with the electromagnet, and moves the valve stem 62 and the valve 59 against the action of the spring 61 to open the valve 59 and to close the auxiliary valve 63. The time delay or pause effected by engagement of the notch 143 with the shoulder 144 is sufficient to insure that the armature 73 positively engages the core of the electromagnet. In some cases where the notch 143 is omitted the movement of the link 111 is so rapid that the armature 73 does not always remain attracted to the core of the electromagnet.

With the component parts in this position the gas flows from the manifold 21 through the temperature controller 22 through conduit 51 to the oven pilot burner 39. The latter having been ignited in the first position of the parts as described above, continue to burn. Gas also flows from the manifold 21 through the heat control unit 22 through the safety valve supply line 26, through the valve 59 to the oven burner supply line 28, through the mixing box 29, where it is intermixed with primary air entering the adjustable orifice 161, through the mixing tube 31, to the oven burner 32. The latter is ignited by the oven pilot burner 39. The gas flow to the sub-burner 36 is interrupted when the safety valve 63 moves to its closed position so that the sub-burner 36 is extinguished.

As the actuating member 101 continues to be moved outwardly the actuating member 101 reaches another operative position wherein the detent link 111 is moved to a position so that the detent notch 143 is disengaged from the bar 144. Due to the force exerted by the spring 139, as described hereinbefore, the detent link 111 and toggle mechanism 128 then return to the position shown in Fig. 5.

By reason of the small size of the orifice 124 limiting the outward movement of the actuating member 101 to a very slow rate of travel, in the order of ⅛" per minute, a sufficient timing interval will have elapsed from the time the oven pilot burner 39 is lighted, as above described, until the link 111 moves to its last position so that the thermocouple 41 is heated to a temperature at which a current is developed that energizes electromagnet 68 sufficiently to hold the armature 73 and hence the safety valve 59 in its open position against the compression of the spring 61. It is to be understood however that if, due to some sub-normal gas pressure or due to clogging of some of the gas lines or orifices, the oven pilot burner 39 did not light, the electromagnet 68 will not be energized. Consequently the valve 59 will not be held in its open position; but will be returned to its closed position by the action of the spring 61 thereby preventing the accumulation of a dangerous quantity of unlighted gas in the oven or kitchen.

To shut off the oven burner 32 after a desired cooking cycle the control knob 49 is depressed and rotated to its neutral position. This shuts off the heat control unit 22 and stops the flow of gas to the oven burner 32 and the oven pilot burner 39. The system will then be in its normal "off" position as shown in Fig. 2.

During the first step, gas is directed through the tube 51 to the oven pilot burner 39; and gas is directed through tube 33, the sub-burner jets 37, the flash passageway 48, and the flashtube 47, the resulting series of flashbacks igniting first the sub-burner and then the oven pilot burner, the flame of the latter burner impinging directly on the thermocouple 41 to actuate the electromagnet 68.

During the second step, the oven pilot burner 39 remains lighted but the sub-burner 36 is extinguished; gas is directed through tube 28, mixing box 29, mixing tube 31, and issues from the oven burner 32 where it is ignited by the previously lighted oven pilot burner flame; safety valve 59 is held open, the auxiliary valve 63 is held closed and the armature is held against the electromagnet by the toggle 128, pending the development by the thermocouple current of an electromagnetic attraction strong enough to hold the armature against the electromagnet in opposition to the force exerted by the spring 61.

During the third step, the oven burner and oven pilot burner remain lighted, the parts being in their normal positions for baking, with the thermocouple current strong enough that the electromagnet alone holds the safety valve disk open and sub-burner disk closed and continues to do so as long as the jet flame impinges upon the thermocouple.

If for any reason the oven pilot burner should be accidentally extinguished while the oven burner is lighted, the danger that the oven burner flame will also be extinguished and fill the oven with explosive gas-air mixture will be averted by the action of the safety valve for as soon as the oven pilot burner flame ceases to impinge on the thermocouple, the latter will cool. This de-energizes the electromagnet. As a result the armature is released thereby allowing the spring 61 to close the valve 59 and shut off the flow of gas to the oven burner 32. Simultaneously the auxiliary valve 63 is opened and gas again flows to the sub-burner 36. With the component parts in this position the system is ready to repeat the lighting cycle of the oven pilot burner 39 and oven burner 32 described hereinbefore.

Due to the residual baking heat in an oven the thermocouple 41 will cool very slowly. Frequently it may take as long as 30 seconds before the thermocouple 41 cools sufficiently so that the generated current becomes small enough to be incapable of energizing the electromagnet to hold the armature 73 and the respective valves in position against the action of the spring 51. If, during this interval of 30 seconds or so, the housewife decides to relight the oven burner 32 and turns the control knob 49 to do so, unlighted gas can pour into the oven through the valve 59 which is held open by the electromagnet, energized by the still hot thermocouple 41. The auxiliary valve 63 will also be closed so that gas cannot be supplied to the sub-burner 36. Consequently the oven pilot burner 39 cannot be relighted. Under these conditions the oven and even the kitchen might become filled with gas before the thermocouple 41 cools sufficiently to close the valve 59 and to open the valve 63 to permit flow of gas to the sub-burner 36. This dangerous condition may be eliminated by providing switch means for opening the thermocouple circuit momentarily each time the control knob 49 is depressed. Only a momentary opening of the circuit is required to effect the release of the armature 73 from the electromagnet 163.

Figure 12:
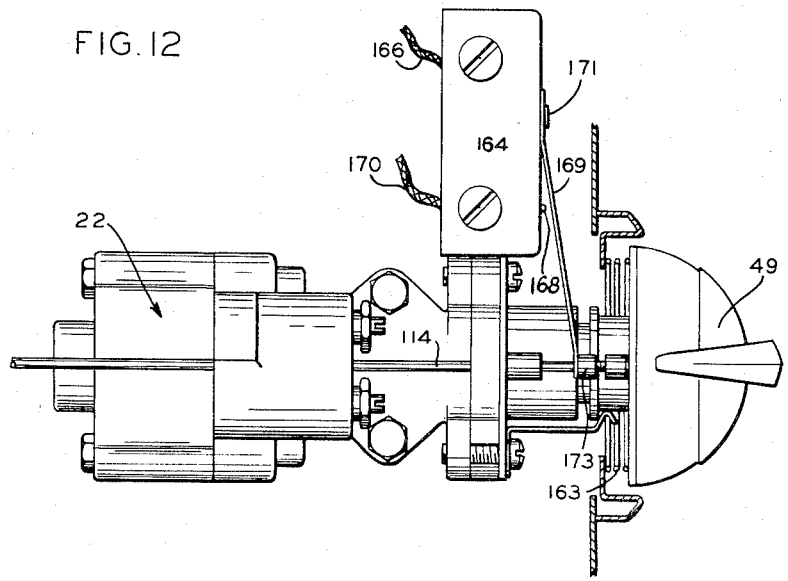
Figures 12 and 13 are top and side views, respectively, of the temperature control unit shown in Figure 1 as it would be used with an electric switch added to open and close the thermocouple circuit.
Figure 13:
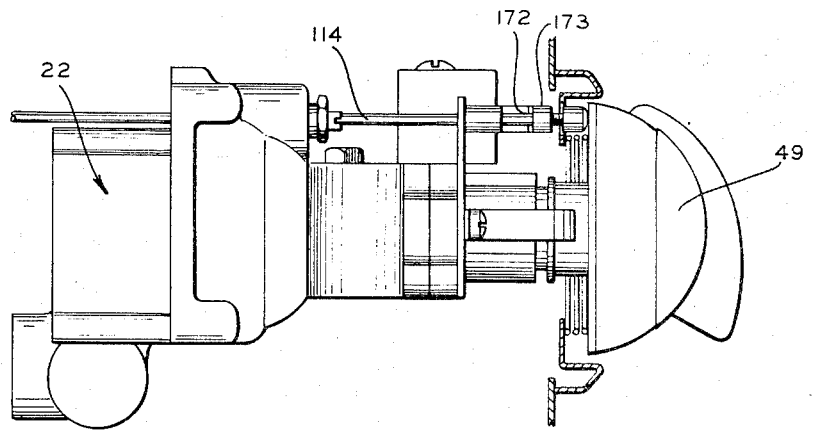

One form of such a switch means is shown in Figures 12 and 13 as it is operably associated with the movement of the control knob 49. The knob 49 and the temperature controller 22 are the same as shown in Figure 1, the construction and operation of which are described in detail in Patent 2,303,011. In this particular design a safety feature is provided to prevent inadvertent turning of the control knob, the construction being such that the knob must be pressed in a definite amount against the spring 163 before it can be rotated. Thus, to operate it the knob is first depressed, then turned, preferably in a clockwise direction; conversely, to turn it off, the knob is rotated counterclockwise to the "off" position and when the knob is released the spring 163 will hold it outwardly in a position where it is locked against rotation. In this instance, a conventional, precision type, normally closed switch 164 will be mounted in any suitable manner upon the temperature control unit 22 and will have the conducting wire 166 leading directly to the thermocouple 41 and the wire 170 leading to the electromagnet 68, this circuit being shown diagrammatically in Figure 17. An operating plunger 168 extends through the switch housing and when depressed opens the switch 164 between wires 166 and 170. The leaf spring 169 is attached to the switch housing by means of a screw or rivet 171 and its other end portion is apertured at 172 to engage the under side of the shoulder 173 formed on the push rod 114 and adapted to depress the plunger 168 to open the thermocouple circuit when the knob 49 is in any depressed position.

Thus, in considering the operation of the lighting system shown in Figure 1, when employing a switch to open the thermocouple circuit, as shown in Figures 12, 13, and 17, the lighting operation will proceed in the same succession of automatic steps already described; and when the oven control knob is depressed the thermocouple current will immediately be broken to allow the safety valve to be closed even though the thermocouple is still at a high temperature from residual heat. The oven can, therefore, be turned off and immediately on again without creating the hazard of a potentially explosive gas-air mixture in the oven.

Some users will prefer the control dial 49 to operate merely by rotating it without depressing it. My device may be adapted for this type of operation by the mechanism shown in Figure 14 where the timer 35 and safety valve unit 27 are mounted at right angles to their positions shown in Figure 1, the parts otherwise being substantially the same. The rod 114a in this case is rotatably engaged within the bushing 174. At the front end portion is attached a lever 176, urged in a counterclockwise direction by the formed wire spring 177. A connecting rod 178 is pivotally engaged at its upper end with the lever 176 and has a shoulder 179 adapted to engage a shoulder 181 formed on the control knob shaft 182. At the other or rear end of the rod 114a, a lever member 183 having arms 184 and 186 is fixed; the arm 184 having a lock nut 187, and set screw 188 adapted to press against the lever 116 to depress the actuating member 101 and operate the linkage 126 in the manner previously described for the push rod 114 in connection with the Figure 2 modification; and the arm 186 carrying the movable contact 189 of a normally closed switch generally designated 191, the switch also having the stationary contact 192 mounted on arm 192 of the bracket 135. The contacts are suitably insulated from the lever 183 and the arm 193 by non-conducting bushings (not shown) and terminal nuts 193 and 194 are associated with the movable and stationary contacts, respectively, for attachment of the wires 166 and 167 to the thermocouple, as shown diagrammatically in Figure 17. It will be noted that the switches shown in Figures 12 and 14 function similarly to open the thermocouple circuit between successive lighting operations.

Considering now the operation of the modification shown in Figure 14, the housewife merely turns the knob to the desired temperature setting. When the control knob is turned, the connecting rod 178 will be lifted by the control shaft shoulder 181, turning the rod 114a clockwise in opposition to the load exerted by the spring 177. At the other end of the rod 114a the lever 183 will be rotated in a direction to depress the actuating member 101 and to move the contacts 189 and 192 manually out of engagement. As the control knob shaft is rotated, the shaft surface 196 will engage the lower vertical edge 197 of the connecting rod 178 and will begin to push the connecting rod out of engagement with the shaft. When the shaft has been rotated about 24° the connecting rod will have been pushed entirely out of engagement with the shaft shoulder and the rod will drop substantially to the position shown in Figure 15 (but out of engagement with the shaft) thereby allowing the lever 183 to return to the position shown in Figure 16 where the contacts 189 and 192 are engaged to close the thermocouple circuit. From this point, the operation is the same as already described for the modification shown in Figure 1, with the timer 35 and the linkage 126 moving the parts of the control valve unit 272 through a series of preselected operating positions.

While I have shown several embodiments of my invention, it will be understood that I do not wish to be limited thereto since many modifications may be made, and I therefore contemplate by the appended claims to cover any such modifications as fall within the true spirit and scope of my invention.

I claim:

1. In an oven lighting system for a gas stove or range, the combination of an oven burner, fuel supply means connected to said oven burner, a heat control unit connected in series with said fuel supply means and said oven burner for regulating the flow of gas to the oven burner, an oven pilot burner, means for supplying gas to said oven pilot burner when the heat control unit is adjusted to effect flow of gas to the oven burner, a constantly burning pilot burner, flashtube means operatively associated with the constantly burning pilot burner and the oven pilot burner, conduit means for conducting gas from said heat control unit to said oven burner and said flashtube means, safety valve means connected in said conduit means for controlling the flow of gas to said oven burner and to said flashtube means, a spring biased linkage mechanism operatively connected to said safety valve means for controlling movement thereof between a first position in which gas flows to said flashtube means and is prevented from flowing to said oven burner and a second position in which gas is prevented from flowing to the flashtube means and flows to the oven burner, manual control means for adjusting the heat control unit to admit the required amount of gas to flow therethrough for a given temperature setting and for moving said linkage mechanism to move said safety valve means to said first position, and pressure fluid operated time means operatively connected to said linkage mechanism for maintaining said safety valve means in its first position for a preselected period of time after which said linkage moves the safety valve means to its second position.

2. In an oven lighting system for a gas stove or range, the combination of an oven burner, fuel supply means connected to said oven burner, a heat control unit connected in series with said fuel supply means and said oven burner for regulating the flow of gas to the oven burner, an oven pilot burner, means for supplying gas to said oven pilot burner when the heat control unit is adjusted to effect flow of gas to the oven burner, a constantly burning pilot burner, flashtube means operatively associated with the constantly burning pilot burner and the oven pilot burner, conduit means for conducting gas from said heat control unit to said oven burner and said flashtube means, a safety valve means connected in said conduit means for controlling the flow of gas to said oven burner and to said flashtube means movable between a first position in which gas flows to said flashtube means and is prevented from flowing to said oven burner and second position in which gas flows to said oven burner and is prevented from flowing to said flashtube means, a spring biased linkage mechanism for controlling the safety valve means having a first position of operation in which the safety valve means is in its first position, a second position of operation in which the safety valve means is in its second position and a third position of operation in which the safety valve means is in its first position, manual means for adjusting said heat control unit engageable with said linkage mechanism for moving it to its first position, stop means engageable with said linkage mechanism for defining at least one of its positions, and timing means operatively connected with said linkage mechanism for controlling the movement of said linkage mechanism successively between its respective positions after the linkage mechanism has been initially positioned in its first position.

3. An oven lighting system for a gas stove or range having in combination an oven burner for connection to a gas supply, a heat control unit for regulating the flow of gas to the oven burner, an oven pilot burner, means for supplying gas to the oven pilot burner when the heat control unit is adjusted to supply gas to the oven burner, a constantly burning pilot burner, a sub-burner, flashtube means interconnecting said constantly burning pilot burner and said sub-burner and the sub-burner and the oven pilot burner for lighting the oven pilot burner from the constantly burning pilot burner, conduit means connecting said heat control unit with said oven burner and said sub-burner, safety valve means in said conduit means movable between extreme positions for controlling the flow of gas to the sub-burner and the oven burner, control means for said heat control unit operable when adjusting the latter to move the safety valve to a first position in which gas flows to the sub-burner and is prevented from flowing to the oven burner, time delay means operable to move the safety valve means to a second position, after a predetermined time in which gas flows to the oven burner and is prevented from flowing to the sub-burner, and means responsive to the temperature of said oven pilot burner for holding the safety valve means in the second position while the oven pilot burner remains lighted.

4. An oven lighting system for a gas stove or range having in combination an oven burner for connection to a gas supply, a heat control unit for regulating the flow of gas to the oven burner, an oven pilot burner, means for supplying gas to the oven pilot burner when the heat control unit is adjusted to supply gas to the oven burner, a constantly burning pilot burner, a sub-burner, flashtube means interconnecting said constantly burning pilot burner and said sub-burner and the sub-burner and the oven pilot burner and operable to effect ignition of the oven pilot burner from the constantly burning pilot burner, conduit means connecting said heat control unit with said oven burner and said sub-burner, safety valve means in said conduit means for controlling the flow of gas to the sub-burner and the oven burner biased to a first position in which gas flows to the sub-burner and is prevented from flowing to the oven burner, control means for said heat control unit, time delay means responsive to operation of said control means operable to move the safety valve means to a second position, after a predetermined time in which gas flows to the oven burner and is stopped from flowing to the sub-burner, and thermoelectric means responsive to the temperature of said oven pilot burner for holding the safety valve in the second position while the oven pilot burner is lighted.

5. In an oven lighting system for a gas stove or range, the combination of an oven burner, fuel supply means connected to said oven burner, a heat control unit connected in series with said fuel supply means for regulating the flow of gas to the oven burner, an oven pilot burner, means for supplying gas to said oven pilot burner when the heat control unit is adjusted to permit flow of gas to the oven burner, a constantly burning pilot burner, flashtube means operatively associated with the constantly burning and the oven pilot burner, conduit means for conducting gas from the heat control unit to said oven burner and said flashtube means, safety valve means connected in said conduit means for controlling the flow of gas to said oven burner and to said flashtube means, manual control means for adjusting the heat control means to admit the required amount of gas to flow therethrough for a given temperature setting and for moving the safety valve means to a first position in which gas flows to said flashtube means and is prevented from flowing to said oven burner, time delay means operable to move the safety valve means to a second position after a predetermined time in which gas is prevented from flowing to the flashtube means and flows to the oven burner and thermoelectric means responsive to the temperature of said oven pilot burner for holding the safety valve means in the second position while the oven pilot burner is lighted.

6. In an oven lighting system for a gas stove or range, the combination of an oven burner, fuel supply means connected to said oven burner, a heat control unit connected in series with said fuel supply means for regulating the flow of gas to the oven burner, an oven pilot burner, means for supplying gas to said oven pilot burner when the heat control unit is adjusted to permit flow of gas to the oven burner, a constantly burning pilot burner, flashtube means operatively associated with the constantly burning and the oven pilot burner, conduit means for conducting gas from the heat control unit to said oven burner and said flashtube means, spring biased safety valve means connected in said conduit means for controlling the flow of gas to said oven burner and to said flashtube means, manual control means for adjusting the heat control means to admit the required amount of gas to flow therethrough for a given temperature setting and for moving the safety valve means to a first position in which gas flows to said flashtube means and is prevented from flowing to said oven burner, time delay means operable to move the safety valve means to a second position after a predetermined time in which gas is prevented from flowing to the flashtube means and flows to the oven burner, thermoelectric means responsive to the temperature of said oven pilot burner for holding the safety valve means in the second position, and switch means operable by movement of said control means connected in series with said last-mentioned means and operable to interrupt the flow of current in said thermoelectric means whereby said safety valve returns to its first position.

7. In a burner lighting system, the combination of a safety valve comprising a body having an inlet port and a pair of outlet ports, a valve element in said body movable between extreme positions for controlling the flow through said inlet and outlet ports, and biasing means for moving the valve means to a first position in which communication is established between the inlet port and one outlet port and the other outlet port is out of communication with the inlet port, time delay means operable after a preselected time for moving the valve element to a second position in which said one outlet port is out of communication with the inlet port and said other outlet port is in communication with the inlet port, and means for moving the valve element to its first position and initiating operation of said time delay means.

8. In a burner lighting system, the combination of a safety valve comprising a body having an inlet port and a pair of outlet ports, a valve element movable between extreme positions for controlling the flow through said inlet and outlet ports, and biasing means for moving the valve element to a first position in which communication is established between the inlet port and one outlet port and the other outlet port is out of communication with the inlet port, fluid controlled time delay means operable after a preselected time for moving the valve element to a second position in which said one outlet port is out of communication with the inlet port and said other outlet port is in communication with the inlet port, and means for moving the valve element to its first position and initiating operation of said time delay means.

9. In a lighting system, the combination of a main burner arranged to be connected to a source of gas, a control unit for controlling the flow of gas to the main burner, a pilot burner for said main burner, means for supplying gas to said main pilot burner when the control unit is adjusted to permit flow of gas to the main burner, ignition means, flash means operatively associated with said ignition means and the pilot burner for lighting the latter from the former, conduit means for conducting gas from said control unit to said main burner and said flash means, safety valve means connected in said conduit means for controlling the flow of gas to said main burner and to said flash means, means for adjusting the control unit to allow gas to flow therethrough and for moving the safety valve means to a first position in which gas flows to said flash means for lighting said pilot burner and is prevented from flowing to said main burner, and means actuated by movement of said means for adjusting the control unit operatively connected with said safety valve means and operable after the passage of a preselected period of time for automatically moving the safety valve means from the first position to a second position in which gas is prevented from flowing to the flash means and flows to the main burner.

10. In a lighting system, the combination of a main burner adapted to be connected to a source of gas, a control unit for controlling the flow of gas to said main burner, a pilot burner for lighting said main burner, means for supplying gas to said pilot burner, ignition means for said pilot burner, conduit means for conducting gas from said control unit to said main burner and said ignition means, safety valve means connected in said conduit means for controlling the flow of gas to said main burner and to said ignition means, means for adjusting said control unit to permit the flow of gas therethrough, means for simultaneously moving the safety valve to a first position in which gas flows to said ignition means to effect lighting of the pilot burner and is prevented from flowing to said main burner, and means operatively connected with said safety valve means and actuated by said last-mentioned means responsive after the passage of a preselected period of time after initial operation of the adjusting means for the control unit for automatically moving the safety valve means from the first position to a second position in which gas is prevented from flowing to the ignition means and flows to the main burner.

11. In a main burner system for gas operated apparatus, the combination of a main burner adapted to be connected to a source of gas, a control unit for controlling the flow of gas to said main burner, a main burner pilot burner, means for supplying gas to said main pilot burner when the control unit is adjusted to permit the flow of gas therethrough, ignition means for said pilot burner, conduit means for conducting gas from said control unit to said main burner and said ignition means, safety valve means connected in said conduit means for controlling the flow of gas to said main burner and to said ignition means, a biased linkage mechanism operatively connected to said safety valve means for controlling the movement thereof between a first position in which gas flows to said ignition means and is prevented from flowing to said main burner and a second position in which gas is prevented from flowing to the ignition means and flows to the main burner, control means for adjusting the control unit to permit the flow of gas therethrough and for moving said linkage mechanism to move said safety valve means to said first position, and time responsive means operatively connected to said linkage mechanism for maintaining said safety valve means in its first position for a preselected period of time after which said linkage mechanism moves the safety valve means to its second position.

12. In a lighting system, the combination of a main burner adapted to be connected to a source of gas, a control unit for controlling the flow of gas to said main burner, a pilot burner for lighting said main burner, means for supplying gas to said main pilot burner when the control unit is adjusted to permit flow of gas to the main burner, ignition means, flash tube means operatively associated with the ignition means and said pilot burner, conduit means for conducting gas from the control unit to said main burner having said flash tube means, safety valve means connected in said conduit means for controlling the flow of gas to said main burner and to said flash tube means, control means for adjusting the control unit to admit gas to flow therethrough and for moving the safety valve means to a first position in which gas flows to said flash tube means and is prevented from flowing to said main burner, time delay means operable to move the safety valve means to a second position after a predetermined period of time in which gas is prevented from flowing to the flash tube means and flows to the main burner and thermal responsive means responsive to the temperature of said pilot burner for holding the safety valve means in the second position while the pilot burner is lighted.

13. In a lighting system, the combination of a main burner adapted to be connected to a source of gas, a control unit for controlling the flow of gas to said main burner, a main burner pilot burner, means for supplying gas to said main burner pilot burner when the first valve is adjusted to permit flow of gas to the main burner, ignition means, flash tube means operatively associated with the ignition means and the main burner pilot burner, conduit means for conducting gas from the control unit to said main burner and said flash tube means, spring biased safety valve means connected in said conduit means for controlling the flow of gas to said main burner and to said flash tube means, control means for adjusting the control unit to permit gas to flow therethrough and for moving the safety valve means to a first position in which gas flows to said flash tube means and is prevented from flowing to said main burner, timing means operable to move the safety valve means to a second position after a predetermined time in which gas is prevented from flowing to the flash tube means and flows to the main burner, thermal responsive means responsive to the temperature of said main burner pilot burner for holding the safety valve means in the second position including an electric circuit, and switch means operative by movement of said control means connected in said circuit and operable to interrupt the flow of current therein whereby said safety valve returns to its first position.

14. In an oven lighting system for a gas stove or range, the combination of an oven burner, fuel supply means connected to said oven burner, a heat control unit connected in series with said fuel supply means and said oven burner for regulating the flow of gas to the oven burner, an oven pilot burner, means for supplying gas to said oven pilot burner when the heat control unit is adjusted to permit flow of gas to the oven burner, a constantly burning pilot burner, flashtube means operatively associated with the constantly burning pilot burner and the oven pilot burner, conduit means for conducting gas from said heat control unit to said oven burner and said flashtube means, safety valve means connected in said conduit means for controlling the flow of gas to said oven burner and to said flashtube means, manual control means for adjusting the heat control means to admit the required amount of gas to flow therethrough for a given temperature setting and for moving the safety valve means to a first position in which gas flows to said flashtube means for lighting said oven pilot burner and is prevented from flowing to said oven burner, and time delay means actuated by movement of said manual control means operatively connected with said safety valve means for moving the latter, after a predetermined time delay, from the first position to a second position in which gas is prevented from flowing to the flashtube means and flows to the oven burner.

15. Safety control apparatus for a fuel burning appliance having main and pilot burners and source of fuel supply, comprising main control means operable between closed and open positions for controlling the flow of fuel from the source to the burners, a safety control device movable between positions and adapted for respectively preventing and permitting flow of fuel from said main control means to at least the main burner while said main control means is in said open position, said safety control device being biased to said flow preventing position, electromagnetic means adapted when energized to hold said safety control device in said flow permitting position, means adapted to be responsive to a flame at the pilot burner for energizing said electromagnetic means, resetting means movable by the opening operation of said main control means to an operative position for causing movement of said safety control device to its flow permitting position, and a timing device forming part of said resetting means for returning said resetting means to an inoperative position after a predetermined period following ignition of the fuel at the pilot burner during which period said flame responsive means has had time to energize said electromagnetic means.

16. In a gas range having an oven with a main burner therein, a constant pilot burner located outside said oven, a safety pilot burner arranged in igniting relation to said main burner, a gas supply line for said main burner including, in sequential arrangement leading thereto, operator-controlled valve means, thermostatic valve means responsive to temperature in said oven, and safety shut-off valve means responsive to said safety pilot burner, and gas supply means for said safety pilot burner leading from said supply line after said operator-controlled valve means and ahead of said thermostatic valve means; means providing automatic ignition for said safety pilot burner from said constant pilot burner, and including flash tube means having an end adjacent said constant pilot burner to receive ignition therefrom, an end adjacent said safety pilot burner to receive gas therefrom, and an intermediate opening, a flash pilot burner associated with said opening to receive ignition from said top pilot burner and provide ignition for said safety pilot burner, and a connection providing gas supply for said flash pilot burner means leading from said line after said thermostatic valve means and ahead of said safety valve means.

17. In a gas range having an oven with a main burner therein, a constant pilot burner located outside said oven and higher than said main burner, a safety pilot burner arranged in igniting relation to said main burner, a gas supply line for said main burner including, in sequential arrangement leading thereto, operator-controlled valve means, thermostatic valve means responsive to temperature in said oven, and safety shut-off valve means responsive to said safety pilot burner, and gas supply means for said safety pilot burner leading from said supply line after said operator-controlled valve means and ahead of said thermostatic valve means; means providing automatic ignition for said safety pilot burner from said constant pilot burner, and including a flash pilot burner at a location substantially lower than said constant pilot burner, flash tube means having an end adjacent said safety pilot burner to receive gas therefrom, and an end adjacent said flash pilot burner for ignition of said safety pilot burner thereby, said flash tube means also including a rising portion having a lower end arranged to receive gas from said flash pilot means and an upper opening for ignition of said flash pilot burner by said top pilot burner, and a connection providing gas supply for said flash pilot burner means, leading from said line after said thermostatic valve means and ahead of said safety valve means.

18. An oven lighting system for a gas stove or range having in combination an oven burner for connection to a gas supply, a heat control unit for regulating the flow of gas to the oven burner, an oven pilot burner, means for supplying gas to the oven pilot burner when the heat control unit is adjusted to supply gas to the oven burner, a constantly burning pilot burner, a sub-burner, flashtube means interconnecting the constantly burning pilot burner and the sub-burner and interconnecting the sub-burner and the oven pilot burner and operable to effect ignition of the oven pilot burner from the constantly burning pilot burner, conduit means connecting said heat control unit with the oven burner and the sub-burner, a safety valve in said conduit means including closure members for controlling the flow of gas to the sub-burner and the oven burner, means within said safety valve resiliently biasing the respective closure members to a first position in which gas flows to the sub-burner and is prevented from flowing to the oven burner, control means for said heat control unit, time delay means responsive to operation of said control means operable to move the safety valve closure members to a second position in which gas flows to the oven burner and is stopped from flowing to the sub-burner, and thermoelectric means responsive to the temperature of the oven pilot burner for holding the safety valve in the second position while the oven pilot burner is lighted.

19. In a gas burner ignition system, in combination, a valve body formed with an inlet port, a main burner outlet port, and an auxiliary pilot burner outlet port, first and second closure members within the valve body movable in unison between extreme positions blocking one or the other of the outlet ports for controlling the flow of gas from the inlet port through the outlet ports, resilient means within the valve body biasing the closure members to a position in which communication is established between the inlet port and the auxiliary pilot burner outlet port to permit the flow of gas from the inlet port through the auxiliary pilot burner outlet port and in which the first closure member is positioned to block communication between the inlet port and the main burner outlet port to prevent the flow of gas from the inlet port through the main burner outlet port, and time delay means operative to position the closure members at a position where the second closure member is maintained blocking communication between the inlet port and the auxiliary pilot burner outlet port to cut off the flow of gas from the inlet port through the auxiliary pilot burner outlet port and in which communication is established between the inlet port and the main burner outlet port to permit the flow of gas from the inlet port through the main burner outlet port, said time delay means being rendered operative after a time delay following the passage of gas from the inlet port through the auxiliary pilot burner outlet port.

20. In apparatus of the class described, in combination, fuel supply means for supplying fuel to a main burner, to a constantly burning pilot burner and to intermediate pilot burner means, shut-off means in said fuel supply means and operable to establish and shut off the supply of fuel to the main burner and to said intermediate pilot burner means, an intermediate pilot burner valve for controlling fuel admission to the intermediate pilot burner means and operable to open position by actuation of said shut-off means to closed position, a main burner valve for controlling fuel admission to the main burner and operable to closed position by actuation of said shut-off means to closed position, means for actuating said intermediate pilot burner valve to closed position and said main burner valve to open position when said shut-off means is actuated to open position, and time-delay means coacting with said shut-off means whereby operation of said time delay means is initiated by operation of said shut-off means to open position, said time-delay means coacting with said intermediate pilot burner valve and with said main burner valve, whereby to produce a time delay after the opening of said shut-off means before opening of said main burner valve and closing of said intermediate pilot burner valve.

References Cited in the file of this patent
UNITED STATES PATENTS

| | | |
|---|---|---|
| 1,910,450 | Smith | May 23, 1933 |
| 1,971,704 | Castonguay | Aug. 28, 1934 |
| 2,019,008 | Hauser | Oct. 29, 1935 |
| 2,049,960 | Jones et al. | Aug. 4, 1936 |
| 2,063,834 | Bast et al. | Dec. 8, 1936 |
| 2,064,832 | Hollander | Dec. 22, 1936 |
| 2,072,034 | Geurink et al. | Feb. 22, 1937 |
| 2,072,552 | Gauger | Mar. 2, 1937 |
| 2,087,433 | Hallman | July 20, 1937 |
| 2,098,192 | Matthews | Nov. 2, 1937 |
| 2,115,370 | Marvin et al. | Apr. 26, 1938 |
| 2,119,385 | Ferrall | May 31, 1938 |
| 2,150,415 | Branche | Mar. 14, 1939 |
| 2,189,829 | Wunsch et al. | Feb. 13, 1940 |
| 2,276,015 | Brodbeck et al. | Mar. 10, 1942 |
| 2,296,686 | Ragan | Sept. 22, 1942 |
| 2,303,029 | Dillman | Nov. 24, 1942 |
| 2,310,556 | Strong | Feb. 9, 1943 |
| 2,318,823 | Wantz | May 11, 1943 |
| 2,377,461 | Swift | June 5, 1945 |